(12) United States Patent
Morico et al.

(10) Patent No.: US 9,493,350 B2
(45) Date of Patent: Nov. 15, 2016

(54) METHOD AND SYSTEM FOR THE PRODUCTION OF HYDROGEN

(71) Applicant: STAMICARBON B.V. ACTING UNDER THE NAME OF MT INNOVATION CENTER, Sittard (NL)

(72) Inventors: Barbara Morico, Rome (IT); Annarita Salladini, Rome (IT); Gaetano Iaquaniello, Rome (IT)

(73) Assignee: STAMICARBON B.V. ACTING UNDER THE NAME OF MT INNOVATION CENTER, Sittard (NL)

( * ) Notice: Subject to any disclaimer, the term of this patent is extended or adjusted under 35 U.S.C. 154(b) by 0 days.

(21) Appl. No.: 14/384,138

(22) PCT Filed: Mar. 11, 2013

(86) PCT No.: PCT/NL2013/050157
§ 371 (c)(1),
(2) Date: Sep. 9, 2014

(87) PCT Pub. No.: WO2013/137720
PCT Pub. Date: Sep. 19, 2013

(65) Prior Publication Data
US 2015/0037246 A1   Feb. 5, 2015

(30) Foreign Application Priority Data

Mar. 16, 2012  (EP) .................................... 12159998

(51) Int. Cl.
*C01B 3/38* (2006.01)
*B01J 8/06* (2006.01)
(Continued)

(52) U.S. Cl.
CPC .................. *C01B 3/382* (2013.01); *B01J 7/00* (2013.01); *B01J 8/009* (2013.01); *B01J 8/067* (2013.01); *B01J 19/02* (2013.01); *C01B 3/384* (2013.01); *C01B 3/48* (2013.01); *C01B 3/501* (2013.01); *B01J 2208/00212* (2013.01); *B01J 2219/0004* (2013.01); *B01J 2219/0286* (2013.01); *C01B 2203/0233* (2013.01); *C01B 2203/0283* (2013.01);
(Continued)

(58) Field of Classification Search
USPC .......................................................... 423/652
See application file for complete search history.

(56) References Cited

U.S. PATENT DOCUMENTS 4,668,494 A * 5/1987 Van Hook .............. B01J 19/127
                                                       252/373
5,229,102 A    7/1993 Minet et al.
(Continued)

FOREIGN PATENT DOCUMENTS

WO   WO-03/066517    8/2003
WO   WO-2009/150678  12/2009

OTHER PUBLICATIONS

Akers et al., "Kinetics of the methane-steam reaction," A.I.Ch.E. Journal (1955) 1(4):471-475.
(Continued)

*Primary Examiner* — Melvin C Mayes
*Assistant Examiner* — Kenneth Vaden
(74) *Attorney, Agent, or Firm* — Morrison & Foerster LLP

(57) ABSTRACT

Disclosed is a process for the production of hydrogen in a reactor system comprising a steam reforming reaction zone comprising a reforming catalyst and a membrane separation zone comprising a hydrogen-selective membrane. The process involves a reaction system of so-called open architecture, wherein the reforming zone and the membrane separation zone operate independently of each other. The invention provides the heat for the reforming reaction through heat exchange from liquid molten salts, preferably heated by solar energy.

11 Claims, 4 Drawing Sheets

(51) Int. Cl.
  *B01J 8/00* (2006.01)
  *C01B 3/48* (2006.01)
  *B01J 19/02* (2006.01)
  *B01J 7/00* (2006.01)
  *C01B 3/50* (2006.01)

(52) U.S. Cl.
  CPC ............ *C01B 2203/0405* (2013.01); *C01B 2203/0833* (2013.01); *C01B 2203/143* (2013.01); *C01B 2203/146* (2013.01); *C01B 2203/82* (2013.01); *Y02P 20/134* (2015.11)

(56) References Cited

U.S. PATENT DOCUMENTS 6,821,501 B2  11/2004  Matzakos et al.

2007/0187079 A1*  8/2007  Shin ................... B01J 8/008
                                                165/159
2008/0256952 A1* 10/2008  Litwin et al. ............ 60/641.8
2009/0123364 A1*  5/2009  Forsyth .................. C01B 3/34
                                                423/651

OTHER PUBLICATIONS

Barba et al., "Membrane reforming in converting natural gas to hydrogen (part one)," Intl J Hydrogen Energy (2008) 33:3700-3709.
Defalco et al., "Reformer and membrane modules plant powered by a nuclear reactor or by a solar heated molten salts: Assessment of the design variables and production cost evaluation," Intl J Hydrogen Energy (2008) 33:5326-5334.
International Search Report for PCT/NL2013/050157, mailed Jun. 26, 2013, 4 pages.

* cited by examiner

METHOD AND SYSTEM FOR THE PRODUCTION OF HYDROGEN

CROSS-REFERENCE TO RELATED APPLICATIONS

This application is the national phase of PCT application PCT/NL2013/050157 having an international filing date of 11 Mar. 2013, which claims benefit of European patent application No. 12159998.9 filed 16 Mar. 2012. The contents of the above patent applications are incorporated by reference herein in their entirety.

FIELD OF THE INVENTION

The invention pertains to the production of hydrogen by the endothermic conversion of hydrocarbons, particularly by steam reforming of light hydrocarbons.

BACKGROUND OF THE INVENTION

Steam reforming is a well known method to generate mixtures of hydrogen and carbon monoxide from light hydrocarbon feeds, which can be used, in turn, for methanol synthesis or Fischer-Tropsch process, or further for hydrogen production. Due to the strong endothermicity, the steam reforming reaction needs to be carried out at a high reaction temperature (>750° C.), and is usually performed by supplying heat to a mixture of steam and a hydrocarbon feed in contact with a suitable catalyst, typically nickel based. The catalyst is usually contained in tubes, which are placed inside a furnace that is heated by combustion of fuel, thus supplying the reforming reaction heat.

The conventional steam reforming reactors are operated in the range of 850-900° C. to push the equilibrium toward complete formation of CO and $H_2$ and the reactor consists of a number of tubes, loaded with a steam reforming catalyst, placed inside a radiant fired chamber. Heat of reaction is supplied through burners to the external surface of the catalyst tubes, either in a top fired configuration or a side-fired design.

In addition to steam reforming (SR) the process includes downstream of the reactor, a CO water-gas shift to convert CO into $CO_2$ and further $H_2$, and a pressure swing adsorption (PSA) unit for final hydrogen purification.

Many attempts are being made to find an attractive process scheme for $H_2$ production. Schemes based on a membrane reactor for steam reforming (MSR) using Pd-alloy membranes are emerging as the most interesting ones.

The background art in this area includes U.S. Pat. No. 6,821,501, which discloses a process for steam reforming using a membrane steam reformer (MSR) reactor and a nameless distributed combustion (FDC). The disclosed process integrates the steam reforming and shift reaction. Whilst such processes, where the membrane is inserted into the reforming reactor, are now commonplace in the art, they make the geometry of the reactor system quite complex. Also, these processes require specific operating conditions and/or the presence of not very active catalyst, and are prone to coke deposition on the catalyst bed and/or on the membranes.

Coke deposition is a major problem in steam reforming, as this requires a shutdown of the production and the regeneration of the catalyst, if at all possible through a decoking procedure.

The reaction heat is generally provided by burning a fossil fuel directly in the reactor or using the exhaust gases from a gas turbine as disclosed in U.S. Pat. No. 5,229,102.

It would be desirable in the art to provide a steam reformer reactor design for producing hydrogen completely free of carbon deposition and without the need to fire fossil fuel to avoid $CO_2$ and NOx emissions. Furthermore, it would be even further desirable if the process were capable of producing a $CO_2$ stream at high concentration, higher than 80% vol. Such a stream could be used for chemical proposes or sequestration, it would be extremely desirable. Also, it is desired, in view of the different heat requirements for the steam reforming and water gas shift steps, to improve the heat management of the process.

SUMMARY OF THE INVENTION

In order to better address one or more of the foregoing desires, the invention presents, in one aspect, a process for the production of hydrogen in a reactor system comprising a steam reforming reaction zone comprising a reforming catalyst and a membrane separation zone comprising a hydrogen-selective membrane, the process comprising:

(a) a reforming step comprising subjecting a hydrocarbon, for example natural gas, to contact with steam in said steam reforming reaction zone so as to produce a gas mixture comprising hydrogen and carbon components;

(b) a membrane separation step comprising contacting said gas mixture with the hydrogen-selective membrane so as to separate hydrogen from the carbon components, thus retaining a gas mixture comprising carbon components as a retentate;

(c) repeating steps (a) and (b) for the retentate of step (b); wherein the heat for reforming step (a) is provided by liquid molten salts, preferably heated by solar energy.

In another aspect, the invention provides a reactor system for the production of hydrogen from hydrocarbons by steam reforming and membrane separation of hydrogen, the system comprising one or more sets comprising a steam reforming unit and, downstream thereof, a membrane separation unit, wherein the steam reforming unit is a reactor provided with a catalyst bed and with one or more fluid connections, such as tubes, for the transport of a heating fluid enabling heat transfer to the reactor, and the membrane separation unit comprises one or more hydrogen selective membranes, wherein said tubes are in fluid communication with a heating system for heating salts by solar energy so as to provide liquid molten salts.

DETAILED DESCRIPTION OF THE INVENTION

Figure 1:
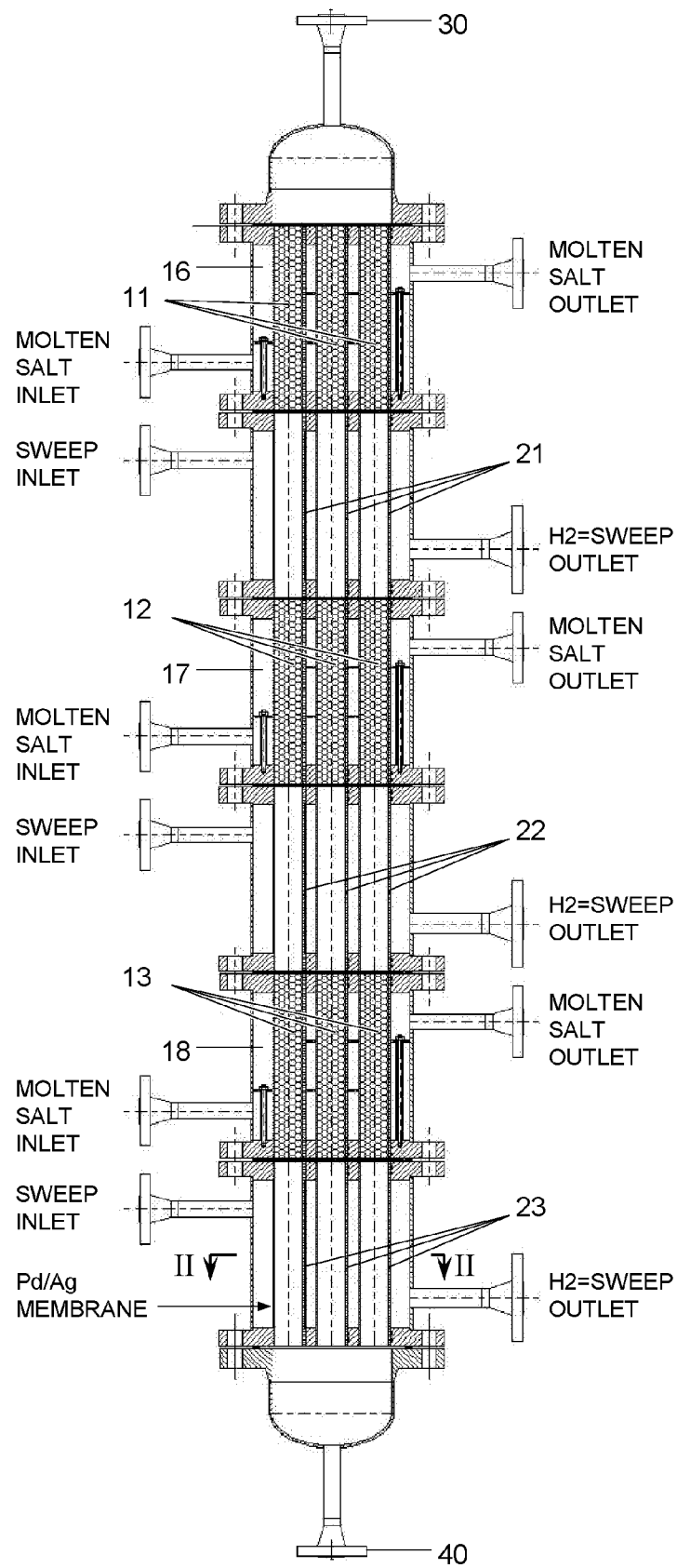
FIG. 1 is a schematic diagram of the novel membrane steam reforming (MSR) reactor with open architecture and heated with liquid molten salts, catalyst sections and permeates sections. In such a scheme there are 3 sections in series.

In a broad sense, the process and system according to the present invention combines the advantages of a so-called open architecture membrane steam reformer (which e.g. serves to avoid coke formation), with a molten salts heating device.

In the present invention, the two major limitations of chemical equilibrium and heat transfer are overcome by the innovative combination of a series of reaction/separation steps in combination with reaction heat provided by molten salts, and preferably molten salts heated by solar energy.

The present invention typically employs only one reactor with a series of reaction zone and separation zones mechanically integrated to convert the hydrocarbon feed to $H_2$ in a very efficient way at low temperature, max 550° C., or even max 500° C. By operating in such a way the required duty is minimized by combining the reforming reaction (R1) with the shift reaction (R2).

(R1) Reforming $$CH_4 + H_2 \rightleftarrows CO + 3H_2 + 206.4 \text{ kJ/gmol}$$

(R2) Water-gas shift $$CO + H_2O \rightleftarrows CO_2 + H_2 - 41.1 \text{ kJ/gmol}$$

The invention entails a combination of (R1) and (R2), which can be given as follows:

(R3) Combination $$CH_4 + 2H_2O \rightleftarrows CO_2 + 4H_2 + 165.2 \text{ kJ/gmol}$$

Hydrogen removal across the membrane shifts the methane conversion to high values, well above the equilibrium in condition at 500° C. The proposed architecture is pushing a combined reaction (3) which requires the lowest enthalpy input to convert methane to hydrogen around less than 20% than in conventional processes, with the attractive feature to produce $CO_2$ at the expense of CO.

Using conventional technology, viz. involving steam reforming (SR) and water gas shift (WGS) reaction, it is not possible to integrate the two steps into one reactor. For, the SR must be operated at a significantly different temperature than the WGS to obtain high product yields.

The open architecture, series of reaction/separation, not only avoid the formation of coke and the slow deactivation of the catalyst. It also makes it possible to optimize independently the single unit operations and simplify the mechanical design of the reformer and its repair.

According to the invention, the steam reforming and the hydrogen separation are carried out in separate zones or units. I.e., the reforming zone and the hydrogen separation zone are such separate entities as to allow the process conditions (pressure, temperature) to be controlled independently in either zone.

Typically, said reforming and separation zones are not integrated in a "closed architecture", although they may be combined in a single confinement. A reforming/separation "closed architecture" is known in the art, for example from WO 99/61368, and consists for example of a membrane separation tube enclosed by a steam reactor tube. A key feature of this type of architecture is that the process conditions, for example in particular temperature and pressure for the reforming reaction and the separation are essentially the same and cannot be varied independently from each other. By contrast, an "open architecture" allows for independent optimization of the process conditions of the reforming reaction and the separation step.

The present invention provides an "open architecture". In a preferred embodiment, the steam reforming and the hydrogen separation are carried out in a single confinement having an open architecture. As a result of this "open architecture", the reforming zone and the separation zone can be performed independently and each step can operate at its own optimized conditions. Typically in order to avoid membranes' stability problems, the temperature in a membrane separation module is maintained slightly below 500° C. and preferably in the range of 420-490° C., more preferably at 450-470° C.

In the traditional membrane reactors applied in membrane steam reforming, the membrane is integrated inside the reaction chamber thus providing for a continuous removal of hydrogen as soon as it is produced. Whilst the reduction of hydrogen partial pressure might enhance the carbonaceous feed conversion, it may also promote coke formation. The invention judiciously avoids this. Since the produced hydrogen is removed outside of the reaction chamber, the hydrogen partial pressure in the reactor increases with the reaction's progress. A further advantage is that the use of separate modules limits the mechanical problems relevant to the integration of the membrane inside the catalytic bed and enables for the rearrangement of already existing plants.

The hydrogen production process is performed, preferably in an open architecture based plant, in several steps, or stages, in the sense that the reforming reaction takes place in one or more reaction zones and the separation of hydrogen from the gas mixture comprising hydrogen and carbon components in one or more membrane separation zones. Preferably, two, three or four sets of reaction and separation zones are used, and most preferably, three.

Thus, the above steps (a) and (b) are repeated one or more times in subsequent reaction and separation zones. In doing so, unreacted hydrocarbon in the retentate from a preceding membrane separation step is used as the hydrocarbon source in a subsequent reforming step.

Another advantage of the proposed reactor is the possibility to couple it with a pre-reforming reactor to convert bio-ethanol for instance into a mixture of methane, CO, $CO_2$ and $H_2$.

The invention is now discussed in more detail with reference to the general sequence of steps.

A hydrocarbon feed is provided. The invention particularly pertains to light hydrocarbons. Light hydrocarbons are hydrocarbons having 1 to 10 carbon atoms, preferably 1 to 6 carbon atoms. Although the term "hydrocarbon feed" is used, it should be noted that the hydrocarbon may comprise components that are not regularly understood to be strictly hydrocarbons, e.g. ethanol and carbon dioxide. Thus, preferably, the "hydrocarbon" feed is selected from the group of light hydrocarbons having 1-6 carbon atoms; ethanol; bio-ethanol; bio-gas (generally a mixture comprising methane and carbon dioxide); a mixture of methane, hydrocarbon, and carbon monoxide; and combinations thereof. A most preferred hydrocarbon feed is natural gas.

The above feed is subjected to steam reforming (SR), i.e. brought in contact with gaseous $H_2O$ under steam reforming conditions.

Advantageously, in the process of the invention, the reforming step is conducted at a relatively low temperature, viz. preferably of from about 350° C. to about 550° C., more preferably from 400 to 550° C. In some embodiments, the maximum temperature can be 500° C. The pressure preferably ranges from about 1 bar to about 50 bar. The reaction heat for the SR is provided by liquid molten salts.

A wide variety of salts, particularly binary or ternary mixtures can be used. Inorganic nitrate salt mixtures are the preferred storage and heat transfer media due to their very favourable combination of density, specific heat, chemical reactivity (very low), vapour pressure (very low) and cost. Mixtures of salts allow to provide a melting point lower than pure components.

Preferred salts include the following: Hitec, which is a ternary mixture of $NaNO_2$, $NaNO_3$ and $KNO_3$ (40% wt, 7% wt, 53% wt) with a melting point of 120° C.; Hitec XL, which is a ternary mixture of $Ca(NO_3)_2$, $NaNO_3$, and $KNO_3$, (about 48% wt, 7% wt, 45% wt) with a melting point of 130° C.; Solar salt, which is a binary salt mixture of $NaNO_3$ and $KNO_3$ (60% wt, 40% wt), with a freezing point of 220° C. A mixture of $LiNO_3$, $NaNO_3$, $KNO_3$ (30% wt, 18% wt, 52% wt) with a melting point of 120° C. For preferred salts reference is also made to WO 2008/071205 A1 and U.S. Pat. No. 7,922,931 B1.

In order to effectively transfer heat from the liquid molten salts to the reforming (reaction) zone, it is particularly preferred that the liquid molten salts have a direct heat exchange contact with the reaction zone. Preferably, the liquid molten salts are provided in a flow passing the reaction zone. To this end the flow of molten salts is made to pass the reaction zone, preferably through a shell surrounding the reaction zone, typically a shell and tube heat exchange system. Preferably, the liquid molten salt is passed in countercurrent flow to the path of the hydrocarbon reforming feed.

The use of direct heat exchange allows the very compact design of the reactor/separation system, especially, in the disclosed shell-tube configuration. In particular this design allows for a very effective countercurrent flow of the molten salt with an optimized heat exchange. Preferably the reactor system of the invention comprises a plurality of steam reforming/membrane separation sections put together in a single confinement, but having an open architecture as described above.

The molten salts preferably have a temperature of from about 400° C. to about 580° C. It is preferred for the temperature to be in a range of from 450° C. to 550° C., more preferably 480° C. to 550° and most preferably 480° C. to 520° C.

The liquid molten salts can be heated by using various sources of energy. Whilst this can be done by heating fossil fuel, the latter is preferred only as an adjunctive method of heating. Preferably, the molten salts are heated by nuclear energy and, more preferably by naturally available energy, such as geothermal energy or, most preferably, solar energy.

The latter evidently has great advantages in terms of costs and process economy, and the environmental sustainability of the process. In order to advantageously use molten salts as a heat transfer fluid, in order to drive the reforming reaction in the process of the invention, a solar heating system is employed comprising an arrangement of mirrors so as to create a sufficiently high solar energy density and temperature level, a solar receiver which absorbs the concentrated solar energy and transfers it to the heat transfer fluid, viz. the molten salt, a storage and/or supplementary firing used to store the solar heat or provide the heat to the liquid molten salts when the sun is not longer shining.

Molten salts technology, generally based on the preferred mixture of sodium and potassium nitrate, is known technology to capture and store solar energy, and to use the resulting fluid as a heat transfer medium. By way of technical background regarding the storage of molten salts and supplementary firing, reference is made to EASAC policy report 16, "Concentrating Solar Power" published through www.easac.eu (November 2011).

In the reforming step, the hydrocarbon feed is contacted with steam under the influence of a reforming catalyst. The catalyst preferably comprises at least one Group VIII transition metal on metallic or ceramic form. Suitable catalysts do not require elucidation to the skilled person. As a result, a gas mixture is formed comprising hydrogen and carbon components, i.e. primarily hydrogen and carbon dioxide, with a lesser amount of carbon monoxide. This gas mixture is subjected, in the membrane separation step (b), to contact with a hydrogen-selective membrane. As a result of allowing the gas mixture to flow past such a membrane, hydrogen is separated (as the filtrate of the membrane), while retaining (i.e. as a retentate) a gas mixture comprising carbon components, notably $CO_2$ and a lesser amount of CO. Preferably, the permeation of hydrogen through the membrane is promoted by means of a sweep gas. Said sweep gas is preferably selected from the group consisting of steam, $CO_2$ and nitrogen. By way of technical background regarding suitable catalysts, reference made to Ghenciu, Current Opinion in Solid State and Materials Science 6 (2002) 389-399. Another reference in this respect is Navarro et al., Hydrogen Production Reactions from Carbon Feedstocks: Fossil Fuels and Biomass; American Chemical Society (web publication Aug. 23, 2007).

Membranes for separation of hydrogen are known. Generally, these can be polymeric membranes or metal membranes. Metal membranes are preferred, with palladium or palladium alloys such as for example Pd—Ag being the most preferred. Thus, the membrane preferably comprises a metal alloy selected from the group consisting of palladium alloys and lead alloys on a support selected from porous asymmetrical supports comprising an intermetallic barrier, and porous ceramics. If present, the intermetallic barrier preferably has a thickness of 0.5-5 micron and is made of $TiO_2$ or TiN. The palladium alloy is preferably selected from the group consisting of an alloy of palladium with 10-30% silver and an alloy of palladium with 30-45% copper. More preferably. the membrane has a thickness of 0.5-5 micron. The membrane preferably has a permeance of 30-300 $Nm^3/m^2 \, h \, bar^{0.5}$.

With the process of the invention, it is advantageously possible to produce hydrogen in a high degree of purity, viz. ranging from 99.99 to 99.999% vol. Typically, the process will result in both hydrogen and carbon dioxide, and the latter is produced in the reactor as a $CO_2$ stream of at least 80% purity.

The invention also concerns a reactor system for conducting the process in the various embodiments discussed above.

The reactor system of the invention comprises a plurality of steam reforming/membrane separation sections, preferably put together in a single confinement, more preferably having an open architecture as described above. In one embodiment of the invention, the system is operated as a shell and tube heat exchanger divided in sections wherein heating is provided by molten salts in a first section and hydrogen separation is carried out with membranes in a second section. The membrane separation section may comprise a plurality of porous stainless steel tubes.

The reaction mixture flows through the tubes in alternating sections of reaction/membrane separation. In the reaction section the tubes are heated with molten salt, in the membrane separation section the hydrogen gas is removed, preferably with the addition of sweep gas. The sweep gas allows to control the process conditions of the membrane separation, preferably the temperature of the membrane separation, typically 400-450° C. The molten salt typically has a temperature of 500° C. to 550° C.

In this preferred embodiment, the construction of the tubes in the reaction section and the membrane separation section will generally be different. The catalyst tubes preferably are made of solid stainless steel. The membrane separation section preferably comprises a plurality of porous stainless steel tubes, which may be produced, e.g., by sintering. The porous tubes are first coated with a barrier material, e.g. titanium nitride (TiN) and subsequently a coating of palladium or palladium containing material is applied to provide the hydrogen separation membrane functionality. The tubes may be provided with flanges so they can be connected to the reaction section tubes.

An advantage of the invention associated with using molten salt is that a relatively high temperature can be used, albeit lower than in typical steam reforming. The use of a liquid improves the heat transfer compared to the conventional system where the heat transfer is carried out with a gas (flue gas). Because of the lower temperature and the absence of a burner, the heat transfer is mostly convective rather than radiant.

The reactor system of the present invention can be used both horizontally and vertically. The latter is preferred. In a vertical configuration it is easier to have a homogeneous packing of the catalyst in the tubes in the reaction section due to gravity. There is less chance of short circuiting. The catalyst type may be conventional steam reforming catalyst for example a random packed foam type catalyst of a random packed cylinder type catalyst. A preferred catalyst would be a noble metal based catalyst.

Another advantage of the reactor system of the invention is that the temperature is more uniform over the length of the reactor than compared to conventional steam reforming systems. As a result it is possible to select a material thickness which is the same all over the length of the reactor. Conventional SR reactor tubes need to have a high material thickness to withstand the high temperatures in the radiant section of the reactor and this leads to unnecessary additional costs in the convection section of the reactor where this high thickness is not necessary. The present reactor may be constructed from 316L steel which is cheaper than the conventional material (HK35 cast).

A further advantage of the invention is that the reactor system is compact because the tubes can be closer together than in a conventional reactor with a burner. The latter requires, in order to avoid direct flame impingement onto the tubes, a minimum distance between the tubes and the burners. This typically leads to a relatively large system.

Thus, in one aspect, the invention presents a reactor system for the production of hydrogen from hydrocarbons by steam reforming and membrane separation of hydrogen, the system comprising one or more sets comprising a steam reforming unit and, downstream thereof, a membrane separation unit, wherein the steam reforming unit is a reactor provided with a catalyst bed and with one or more fluid heat transfer units, particularly a shell surrounding a reactor tube, enabling heat transfer to the reactor, and the membrane separation unit comprises one or more hydrogen selective membranes, wherein said fluid transfer units are in fluid communication with a heating system for heating salts by solar energy so as to provide liquid molten salts.

The heating system preferably comprises:
  a concentrating system using mirrors to create a sufficiently high energy density and temperature level;
  a solar receiver for absorbing the concentrated solar energy and transferring it. Said transfer will be to the heating fluid, viz. the molten salts. It is further preferred that the reactor system comprises a storage for solar heat, for example a storage tank for molten salts. Also, considering the fact that solar energy will not always be available, or will be available in varying strengths, the reactor system preferably also comprises, in addition to the heating by solar energy, a supplementary firing system, e.g. based on conventional fuel heating, enabling heat transfer independently of the availability of solar energy.

In the reactor system of the invention, the heating fluid (molten salts) is preferably provided in the form of a heating zone surrounding a reactor tube.

The invention is hereinafter further illustrated with reference to the figures and the example. The invention is not limited thereto but only by the claims. Where the term "comprising" is used in the present description and claims, it does not exclude other elements or steps. Where an indefinite or definite article is used when referring to a singular noun, e.g., "a" or "an", "the", this includes a plural of that noun unless something else is specifically stated.

Figure 2:
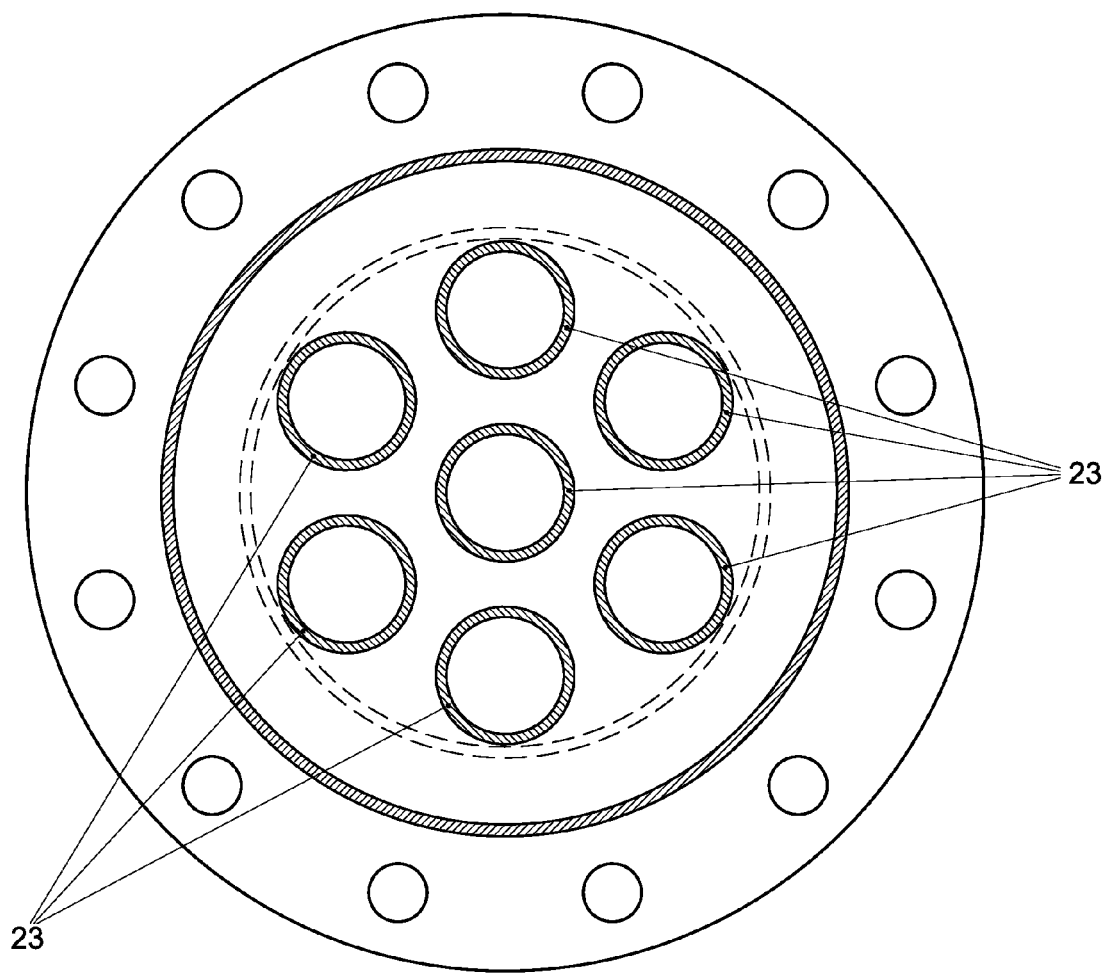
FIG. 2 depicts a cross-section of the reactor shown in FIG. 1

FIG. 1 shows the MSR reactor consisting of a series of 3 reactions+separation modules. FIG. 2 shows a cross-section thereof at the height of section "II"-"II".

Figure 3:
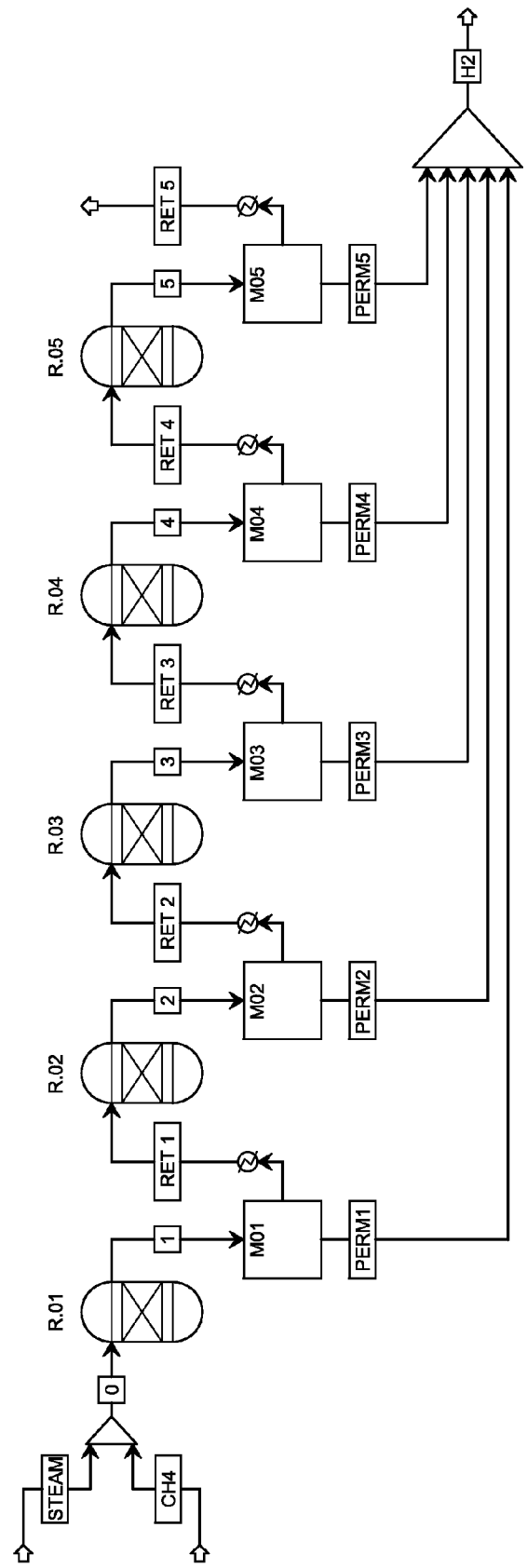
FIG. 3 is a simplified flow diagram of the proposed functional architecture for modeling purposes. In this scheme 5 sections in series are depicted.

FIG. 3 shows a schematic diagram of the membrane steam reformer heated by liquid molten salts, where reaction zones followed by separation zones (5 in total).

In the figures, section 11, 12 and 13 are the reaction zones where the catalyst is loaded into the tubes and in the shells 16, 17 and 18 liquid molten salts are circulated in countercurrent.

Section 21, 22 and 23 are the $H_2$ separation zones consisting of tubes where membrane is placed in the outside part of tube of the porous metal support and separated from such a support by an intermetallic barrier made for instance of TiN or $TiO_2$.

On the shell side of said sections $N_2$, $CO_2$ or steam are recirculated as sweeping agent to lower the partial pressure of $H_2$ and to have a higher driving force for $H_2$ separation. The temperature of the sweep gas may also be controlled to adjust the membrane temperature.

The feed steam mixture is entering the gas inlet 30, meanwhile the $CO_2$ reach stream exits from the gas outlet 40. Such effluent which contains mainly $CO_2$, CO and $H_2$ may be subject to a further shift reaction at 200-300° C. to lower the CO content to less than 0.1% vol. and having a $CO_2$ content higher than 80% vol. on dry basis.

Hydrogen is collected on shell part of said sections, the CO level in such stream may range from 10 ppm to 200 ppm.

The proposed geometry is basically independent from the membrane permeance which however determines the extent of said zones, being quite clear that higher membrane permeance allows to make the reactor more compact. The permeance used for the preliminary design is 100 $Nm^3/m^2 \cdot h \cdot bar^{0.5}$ which is only 2 times higher from that tested in the authors' pilot plant.

Membranes suitable for use in the present invention include various metals and metal alloys on porous ceramic or porous metallic supports. The preferred membrane support is porous stainless steel with an intermetallic barrier deposited on. Pd or better Pd-alloy membranes are the preferred one for such application. The following example will serve to illustrate the invention disclosed herein. Such example is intended only as mean of illustration and should not be construed as limiting the scope of invention in any way. Those skilled in the art will recognize many variations that may be made without departing from the spirit of the disclosed invention.

Whilst the foregoing description specifically is directed to production of hydrogen by steam reforming, the invention as described is also applicable to other types of endothermic conversions of hydrocarbon that result in the formation of hydrogen, and wherein hydrogen is subsequently removed. An example hereof is the catalytic dehydrogenation of alkanes, such as propane, which results in the formation of the corresponding alkene and hydrogen. In the invention, the steam reforming reactor is then replaced by a catalytic dehydrogenation reactor.

In this respect the invention also provides a process for the production of hydrogen in a reactor system comprising an alkane dehydrogenation reaction zone comprising an alkane dehydrogenation catalyst and a membrane separation zone comprising a hydrogen-selective membrane, the process comprising:

(a) an alkane dehydrogenation step comprising subjecting a hydrocarbon feed to dehydrogenation in said hydrocarbon dehydrogenation reaction zone so as to produce a gas mixture comprising hydrogen and alkene;

(b) a membrane separation step comprising contacting said gas mixture with the hydrogen-selective membrane so as to separate hydrogen from the alkene, thus retaining a gas mixture comprising alkene as a retentate;

(c) repeating steps (a) and (b) for the retentate of step (b); wherein the heat for the reforming step (a) is provided by liquid molten Also, the invention provides a reactor system for the production of hydrogen by endothermic conversion of hydrocarbons, particularly catalytic dehydrogenation of alkanes and membrane separation of hydrogen, the system comprising one or more sets comprising a hydrocarbon conversion unit, particularly a catalytic dehydrogenation unit and, downstream thereof, a membrane separation unit, wherein the hydrocarbon conversion, particularly the alkane dehydrogenation unit, is a reactor provided with a catalyst bed and with one or more fluid connections, such as tubes, for the transport of a heating fluid enabling heat transfer to the reactor, and the membrane separation unit comprises one or more hydrogen selective membranes, wherein said fluid connections are in fluid communication with a heating system for heating salts by solar energy so as to provide liquid molten salts.

EXAMPLE

A simulated reactor to produce 5 Nm$^3$/h of pure hydrogen was developed to demonstrate the validity of this invention. The simulated reactor, as generally described in FIG. 1 consisted of 5 steps of reaction followed by H$_2$ separation.

Figure 4:
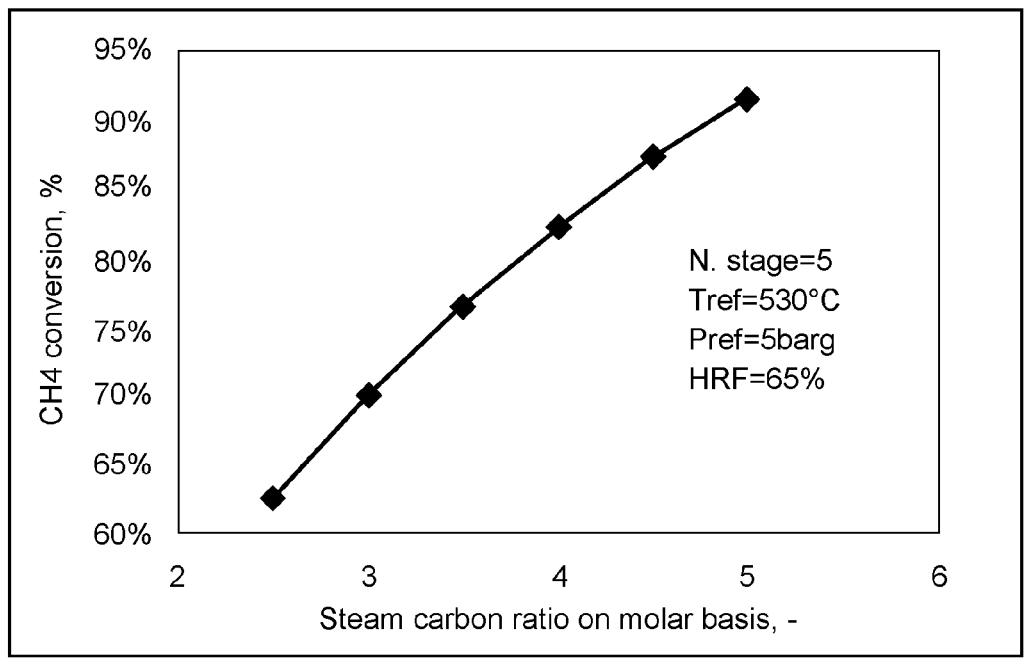
FIG. 4 is a diagram showing the impact of the steam/carbon (s/c) ratio versus the feed conversion.

An overall feed conversion of almost 82.5% is reached at a reforming temperature of 530° C., a hydrogen removal factor (HRF) of 65% and a steam/carbon (S/C) ratio of 4. By increasing the S/C ratio conversely from what happens in a conventional steam reforming the overall absorbed duty does not significantly increase, meanwhile the feed conversion is strongly affected as it is possible to see in FIG. 4 where with an S/C of 5 a conversion of 92% is reached. Higher feed conversion may be reached by increasing also the number of steps or by operating at higher pressure. In such latest case the feed consumption per Nm$^3$/h of hydrogen produced is 2150 Kcal/Nm$^3$ of hydrogen produced compared to 3000-3200 Kcal/Nm$^3$ of hydrogen produced using conventional technologies. The un-reacted gas leaving the system has a CO$_2$ content of almost 80% on dry basis after a low temperature shift step.

The results, in terms of the composition of the streams obtained in various stages and for various S/C ratios is given in the tables below. Tables 1, 2 and 3 indicate absorbed duty due to an increase of steam carbon ratio from 3 to 5. In the simulated reactor with 5 steps of reaction followed by H$_2$ separation, an overall increase of absorbed duty less than 1% (from 3845 to 3880 kcal/h) is detected increasing steam carbon ratio from 3 to 5 keeping a constant hydrogen production of 5 Nm$^3$/h. In the case of traditional reformer, working at the same pressure but at higher temperature (850° C.), the increase in Steam carbon ratio from 3 to 5 cause an increase of absorbed duty over 8% (from 4550 to 4934 kcal/h). Due to the high reaction temperature, more thermal energy is required to heat reaction mixture. The greater the amount of steam in the reaction mixture the greater is this contribution to the overall absorbed duty.

Figure 5:
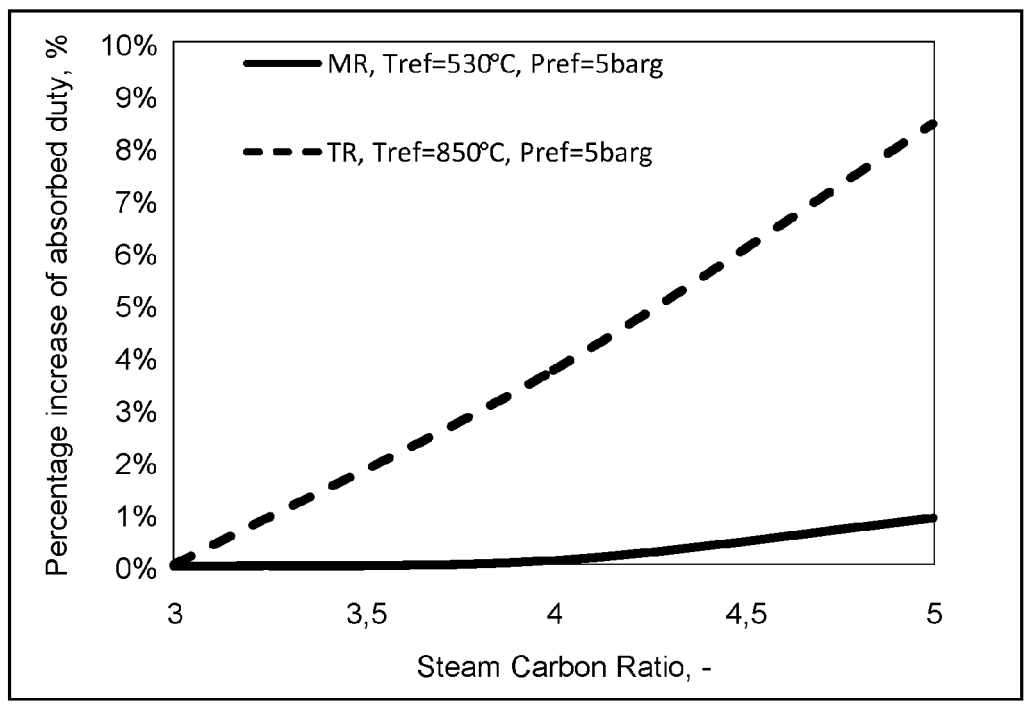
FIG. 5 is a diagram showing the percentage increase of absorbed duty as a function of the s/c ratio for a membrane reformer in comparison with a traditional reformer.

FIG. 5 shows the percentage increase of absorbed duty for a hydrogen production of 5 Nm$^3$/h in the case of traditional reformer (TR) working at 850° C. and 5 barg respect to the proposed membrane reactor (MR) working at the same pressure and at a reforming temperature of 530° C.

TABLE 1

Results CASE A (S/C$_{mol}$ = 3; Reforming Temperature = 530° C.; Reformer Pressure = 5 barg; HRF = 65%)

| CASE A | STREAM | | | | | | | CASE | REFOMER | | |
|---|---|---|---|---|---|---|---|---|---|---|---|
| Component | 0 | 1 | 2 | 3 | 4 | 5 | RET 5 | A | DUTY | | CASE A |
| CH4 | 25.00% | 15.64% | 14.33% | 12.78% | 11.12% | 9.39% | 10.57% | Qr1 | 1605 kcal/h | CH4 | 69.92% |
| CO | 0.00% | 0.62% | 0.89% | 1.15% | 1.39% | 1.62% | 1.83% | Qr2 | 672 kcal/h | Conversion | |
| CO2 | 0.00% | 5.62% | 0.16% | 12.79% | 16.48% | 20.21% | 22.75% | Qr3 | 588 kcal/h | H2 | 5 Nm3/h |
| H2 | 0.00% | 24.34% | 21.68% | 18.85% | 18.39% | 17.14% | 6.75% | Qr4 | 519 kcal/h | Production | |
| H2O | 75.00% | 53.78% | 53.94% | 53.43% | 52.62% | 51.64% | 58.11% | Qr5 | 461 kcal/h | | |
| | | | | | | | | TOTAL | 3845 kcal/h | | |

TABLE 2

Results CASE B (S/C$_{mol}$ = 4; Reforming Temperature = 530° C.; Reformer Pressure = 5 barg; HRF = 65%)

| CASE B | STREAM | | | | | | | CASE | REFOMER | | |
|---|---|---|---|---|---|---|---|---|---|---|---|
| Component | 0 | 1 | 2 | 3 | 4 | 5 | RET 5 | B | DUTY | CASE B | |
| CH4 | 20.00% | 11.52% | 9.86% | 8.04% | 6.20% | 4.40% | 4.89% | Qr1 | 1638 kcal/h | CH4 | 82.30% |
| CO | 0.00% | 0.54% | 0.76% | 0.95% | 1.10% | 1.20% | 1.34% | Qr2 | 678 kcal/h | Conversion | |
| CO2 | 0.00% | 5.52% | 8.93% | 12.39% | 15.84% | 19.25% | 21.40% | Qr3 | 586 kcal/h | H2 | 5 Nm3/h |
| H2 | 0.00% | 23.68% | 20.88% | 18.84% | 17.10% | 15.43% | 6.00% | Qr4 | 508 kcal/h | Production | |
| H2O | 80.00% | 58.74% | 59.57% | 59.78% | 59.77% | 59.72% | 66.37% | Qr5 | 439 kcal/h | | |
| | | | | | | | | TOTAL | 3849 kcal/h | | |

TABLE 3

Results CASE C (S/C$_{mol}$ = 5; Reforming Temperature = 530° C.; Reformer Pressure = 5 barg; HRF = 65%)

| CASE C | STREAM | | | | | | | CASE | REFOMER | | |
|---|---|---|---|---|---|---|---|---|---|---|---|
| Component | 0 | 1 | 2 | 3 | 4 | 5 | RET5 | C | DUTY | CASE C | |
| CH4 | 16.67% | 8.85% | 7.02% | 5.14% | 3.34% | 1.76% | 1.83% | Qr1 | 1698 kcal/h | CH4 | 91.45% |
| CO | 0.00% | 0.48% | 0.66% | 0.79% | 0.87% | 0.86% | 0.94% | Qr2 | 692 kcal/h | Conversion | |
| CO2 | 0.00% | 5.38% | 8.65% | 11.89% | 15.03% | 17.89% | 19.67% | Qr3 | 589 kcal/h | H2 | 5 Nm3/h |
| H2 | 0.00% | 22.97% | 19.99% | 17.67% | 15.50% | 13.14% | 5.03% | Qr4 | 496 kcal/h | Production | |
| H2O | 83.33% | 62.32% | 53.59% | 64.51% | 65.26% | 66.24% | 72.43% | Qr5 | 406 kcal/h | | |
| | | | | | | | | TOTAL | 3880 kcal/h | | |

The invention claimed is:

1. A process for the production of hydrogen in a system which system comprises a steam reforming reaction zone comprising a reforming catalyst and a membrane separation zone comprising a hydrogen-selective membrane wherein the steam reforming reaction zone and the membrane separation zone are arranged in series;
   wherein the steam reforming and the membrane separation of hydrogen are carried out in a single confinement and wherein the steam reforming zone and the membrane separation zone operate individually of each other and at different process conditions;
   the process comprising:
   (a) a reforming step conducted at a temperature of from about 350° C. to about 500° C. and a pressure of from about 1 bar to about 50 bar comprising subjecting a light hydrocarbon feed to contact with steam in said steam reforming reaction zone so as to produce a gas mixture comprising hydrogen and carbon components;
   (b) a membrane separation step comprising contacting said gas mixture comprising hydrogen and carbon components in said membrane separation zone with the hydrogen-selective membrane so as to separate hydrogen from the carbon components, thus retaining a gas mixture comprising carbon components as a retentate; and
   (c) repeating steps (a) and (b) for the retentate of step (b);
   wherein the heat for the reforming step (a) is provided by liquid molten salts which have direct heat exchange contact with the steam reforming reaction zone.

2. A process according to claim 1, wherein the liquid molten salts are heated by nuclear energy, geothermal energy, or solar energy.

3. A process according to claim 1, wherein the liquid molten salts are provided in a flow passing through a shell surrounding the steam reforming reaction zone.

4. A process according to claim 3, wherein the liquid molten salt is passed countercurrent to the path of the light hydrocarbon feed.

5. A process according to claim 1, wherein the molten salts have a temperature of from about 400° C. to about 580° C.

6. A process according to claim 1, wherein the light hydrocarbon feed is selected from the group of hydrocarbons having 1-6 carbon atoms; ethanol; bio-ethanol; bio-gas; a mixture of methane, hydrocarbon, and carbon monoxide; and combinations thereof.

7. A process according to claim 1, wherein the molten salts comprise a binary mixture of sodium nitrate and potassium nitrate.

8. A process according to claim 1, wherein a sweep gas is applied to promote the permeation of hydrogen through said membrane and/or to control the process conditions of the separation membrane wherein the sweep gas is recirculated in a shell part arranged next to said membrane separation zones and hydrogen is collected from said shell part.

9. A process according to claim 8, wherein the sweep gas is selected from the group consisting of steam, $CO_2$ and nitrogen.

10. The process of claim 1 wherein step (c) is conducted in one or more subsequent steam reforming reaction zones and one or more subsequent membrane separation zones, and wherein said gas mixture comprising carbon components flows through said steam reforming zones and said membrane separation zones.

11. The process of claim 10 wherein the steam reforming zones and said membrane separation zones are arranged in series in a single reactor.

\* \* \* \* \*